US008297531B2

United States Patent
Anderson et al.

(10) Patent No.: US 8,297,531 B2
(45) Date of Patent: Oct. 30, 2012

(54) AUTOMATIC SOLVENT INJECTION FOR PLURAL COMPONENT SPRAY GUN

(75) Inventors: Richard D. Anderson, Maple Grove, MN (US); Joseph E. Tix, Hastings, MN (US); Jeffrey N. Velgersdyk, Minnetonka, MN (US); Douglas S. Ryder, St. Michael, MN (US); Christopher J. Pellin, Burnsville, MN (US); Mark T. Weinberger, Mounds View, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 204 days.

(21) Appl. No.: 12/673,562

(22) PCT Filed: Sep. 11, 2008

(86) PCT No.: PCT/US2008/075963
§ 371 (c)(1),
(2), (4) Date: Feb. 15, 2010

(87) PCT Pub. No.: WO2009/036129
PCT Pub. Date: Mar. 19, 2009

(65) Prior Publication Data
US 2011/0101129 A1 May 5, 2011

Related U.S. Application Data

(60) Provisional application No. 60/971,305, filed on Sep. 11, 2007.

(51) Int. Cl.
*B05B 15/02* (2006.01)

(52) U.S. Cl. ........ 239/112; 239/410; 239/412; 239/414; 239/417.5; 239/525; 239/526

(58) Field of Classification Search .................. 239/104, 239/106, 112, 407, 410, 412, 414, 417, 417.5, 239/525, 526
See application file for complete search history.

(56) References Cited

U.S. PATENT DOCUMENTS

| | | | |
|---|---|---|---|
| 2,277,928 A | 3/1942 | McKee | |
| 3,653,594 A * | 4/1972 | Bok et al. | 239/112 |
| 3,786,990 A | 1/1974 | Hagfors | |
| 3,837,575 A | 9/1974 | Lehnert | |
| 3,873,023 A * | 3/1975 | Moss et al. | 239/112 |
| 3,945,569 A | 3/1976 | Sperry | |
| 4,159,079 A | 6/1979 | Phillips, Jr. | |

(Continued)

OTHER PUBLICATIONS

Graco Fast-Set Plural-Component Equipment and Accessories brochure, pp. 11-15.

*Primary Examiner* — Steven J Ganey
(74) *Attorney, Agent, or Firm* — Douglas B. Farrow

(57) ABSTRACT

A solvent piston 22 shuttles between first and second positions. In the first position, high pressure air applied to the rear 22*a* of the solvent piston 22 closes a solvent bore 24 around the solvent piston 22 and prevents passage of solvent into the mix chamber 26. In the second position, high pressure air is applied to the front 22*b* of the solvent piston 22 causing it to retract slightly thereby uncovering the solvent bore 24, closing off the solvent inlet 28 and allowing a slug of solvent to mix with the purge air 32 and pass from the solvent outlet 30 into the mix chamber 26. The solvent is either self contained in the applicator or plumbed eternally to the gun.

1 Claim, 6 Drawing Sheets

U.S. PATENT DOCUMENTS

| | | | |
|---|---|---|---|
| 4,529,126 A * | 7/1985 | Ives | 239/417.5 |
| 5,170,939 A * | 12/1992 | Martin | 239/112 |
| 5,299,740 A | 4/1994 | Bert | |
| 6,533,187 B2 | 3/2003 | May | |
| 6,634,570 B2 | 10/2003 | Scherer | |
| 7,216,816 B2 | 5/2007 | Hammarth et al. | |
| 2004/0050962 A1 | 3/2004 | Hammarth | |
| 2005/0218556 A1 | 10/2005 | Donatti et al. | |

* cited by examiner

AUTOMATIC SOLVENT INJECTION FOR PLURAL COMPONENT SPRAY GUN

TECHNICAL FIELD

This application claims the benefit at U.S. application Ser. No. 60/971,305, filed Sep. 11, 2007, the contents of which are hereby incorporated by reference.

BACKGROUND ART

Spray guns for applying plural component materials such as fast set foams are well known and typically available in both mechanical purge and air purge variants. The previously known means of purging two component material in mechanical purge guns was through a mechanical purge rod sliding through the mixing bore. This arrangement has the issue of the purge rod sticking inside the bore due to buildup of the sprayed material.

In air purge guns, the previous means of purging two component material was through a high pressure air purging (blast of air through mixing chamber). This design lead to buildup on the internal passages of the mixing chamber and spray tip causing the spray pattern to deteriorate, requiring the operator to clean the mixing chamber to restore functionality.

DISCLOSURE OF THE INVENTION

It is an object of this invention to prevent mixed two component polyurethane. from curing within the internal passages of the spray applicator, allowing the user to spray longer before spray pattern distortion occurs or gun maintenance is required.

The mechanical purge gun dispenses the solvent by means of an internal pumping mechanism. The purge rod consists of a small diameter rod and a larger one. As the purge rod is pulled back through the mixing chamber the smaller rod section replaces the larger rod and thus creates a vacuum to pull in the solvent. As the rod moves forward to close the gun the solvent is expelled under pressure from the internal pump along the surface of the purge rod into the mixing chamber, from there it is purged from the gun along with the mixed two component material. The solvent is either self contained in the applicator or plumbed eternally to the gun.

The air purge gun automatically dispenses the solvent at de-trigger by means, of an internal dosing pump. The dispensed solvent is mixed with the purge air and expelled from the gun through the mixing chamber orifices, Alternatively, the air purge gun automatically dispenses the solvent at de-trigger by means of an internal pumping mechanism. The dispensed solvent is mixed with the purge air and expelled from the gun through the mixing chamber orifices. In another embodiment, the air purge gun automatically dispenses the solvent at de-trigger by means of venturi effect. The solvent is injected into the air stream and expelled from the applicator through the mixing chamber orifices. The solvent is either self contained in the applicator or plumbed eternally to the gun.

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

Figure 1:
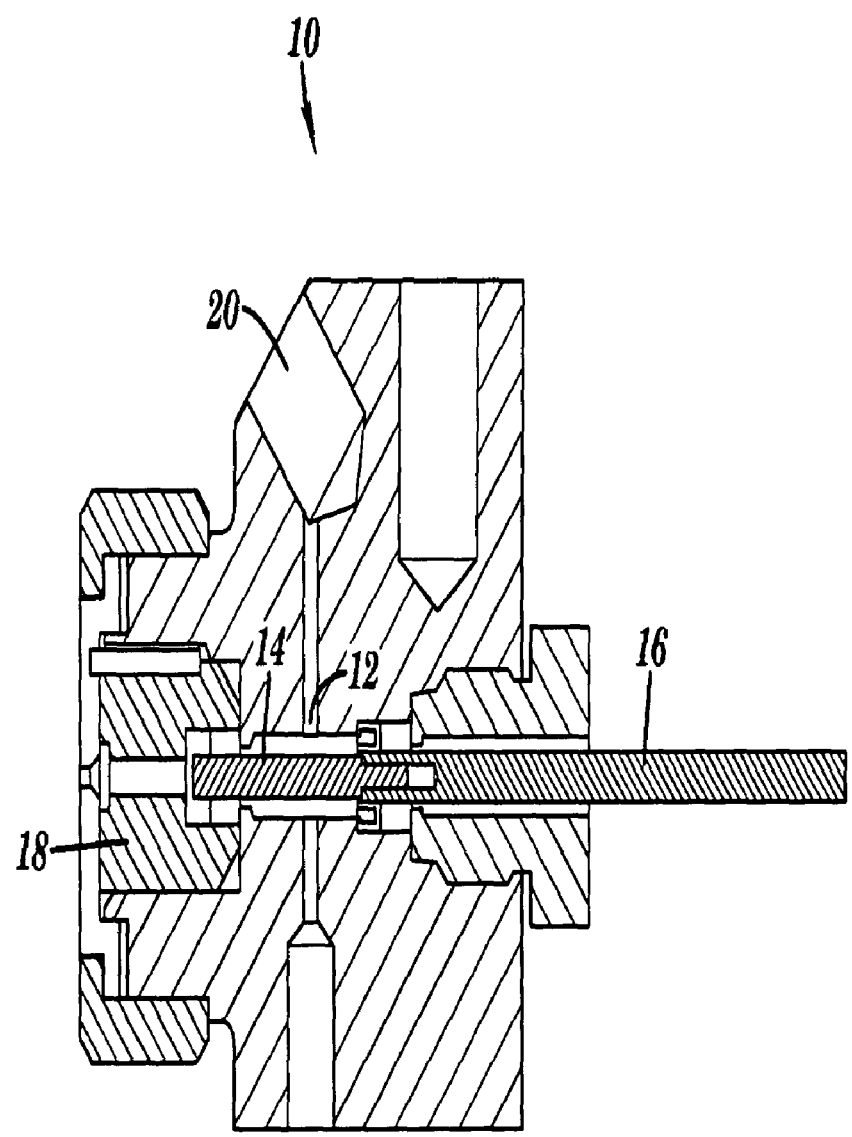
FIG. 1 shows a mechanical purge spray gun showing the device of the instant invention.

The mechanical purge gun 10 of FIG. 1 dispenses the solvent by means of an internal pumping mechanism. The purge rod 12 consists of a small diameter rod 14 and a larger one 16. As the purge rod 12 is pulled hack through the mixing chamber 18 the smaller rod 14 section replaces the larger rod 16 and thus creates a vacuum to pull in the solvent from the solvent inlet 20. As the rod 12 moves forward to close the gun 10 the solvent is expelled under pressure from the internal pump along the surface of the purge rod 12 into the mixing chamber 18, from there it is purged from the gun 10 along with the mixed two component material. The solvent is either self contained in the applicator or plumbed eternally to the gun.

Figure 2:
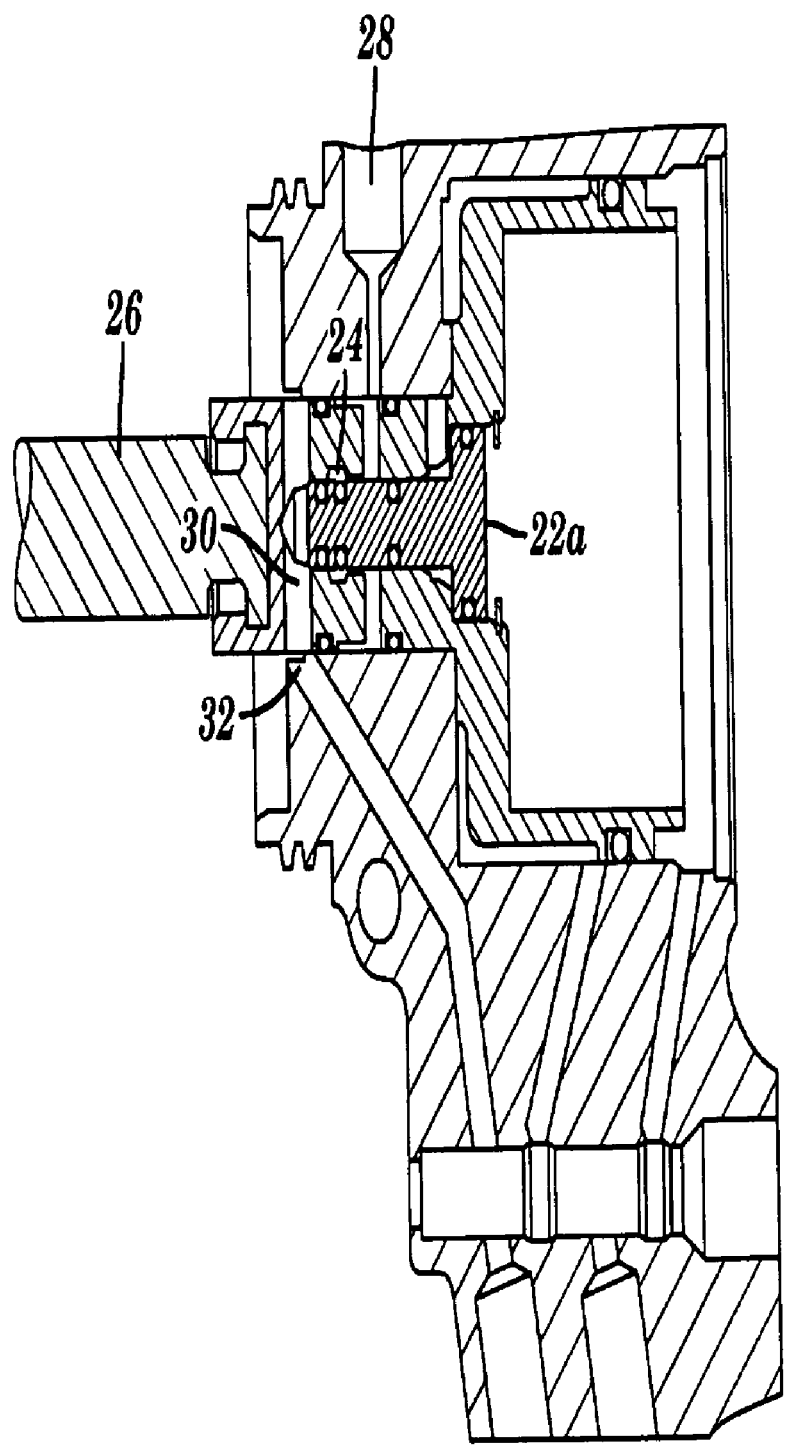
FIG. 2 shows the preferred embodiment of an air purge gun with the gun not spraying.
Figure 3:
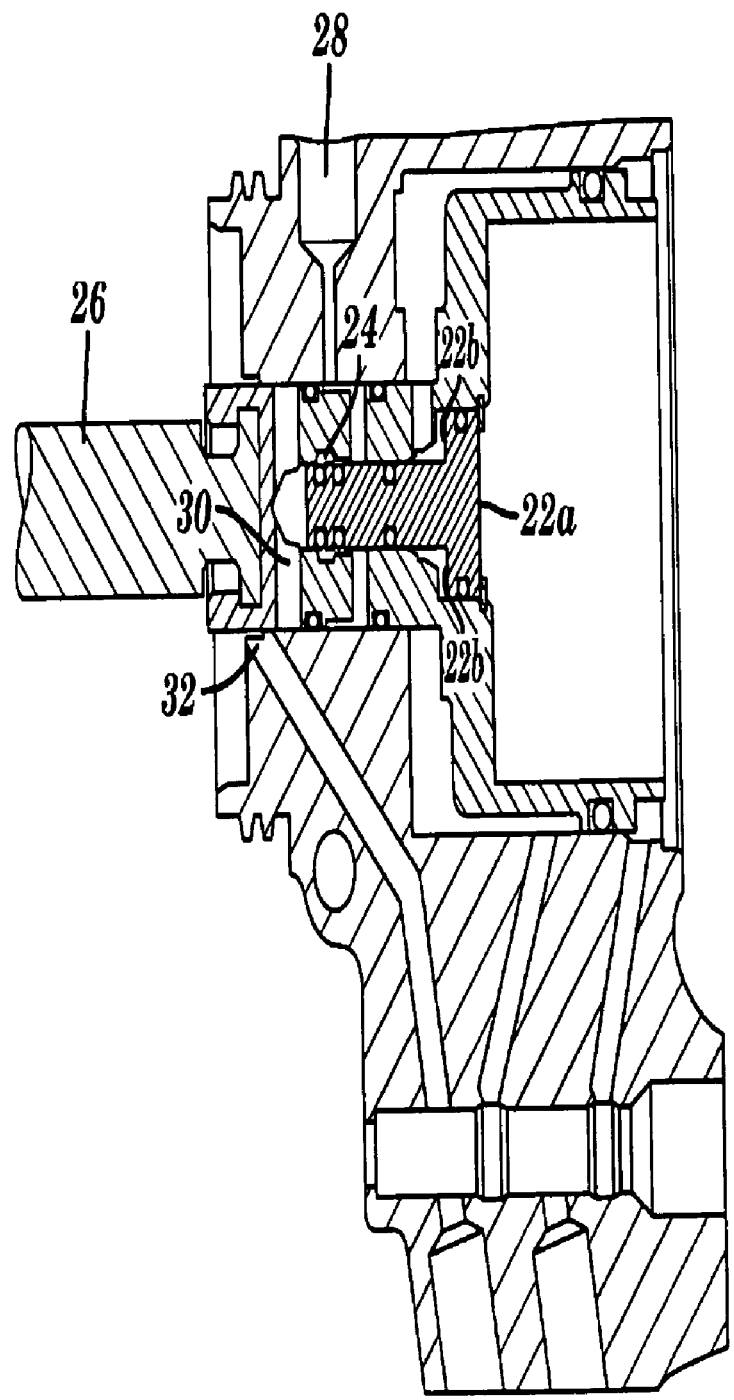
FIG. 3 shows the preferred embodiment of an air purge gun with the gun spraying.

In the preferred embodiment of FIGS. 2 and 3, a solvent piston 22 shuttles between first (non-spraying—FIG. 2) and second (spraying—FIG. 3) positions. In the first position, high pressure air applied to the rear 22a of the solvent piston 22 closes a solvent bore 24 around the solvent piston 22 and prevents passage of solvent into the mix chamber 26. In the second position, high pressure air is applied to the front 22b of the solvent piston 22 causing it to retract slightly thereby uncovering the solvent bore 24, closing off the solvent inlet 28 and allowing a slug of solvent to mix with the purge air 32 and pass from the solvent outlet 30 into the mix chamber 26.

Figure 4:
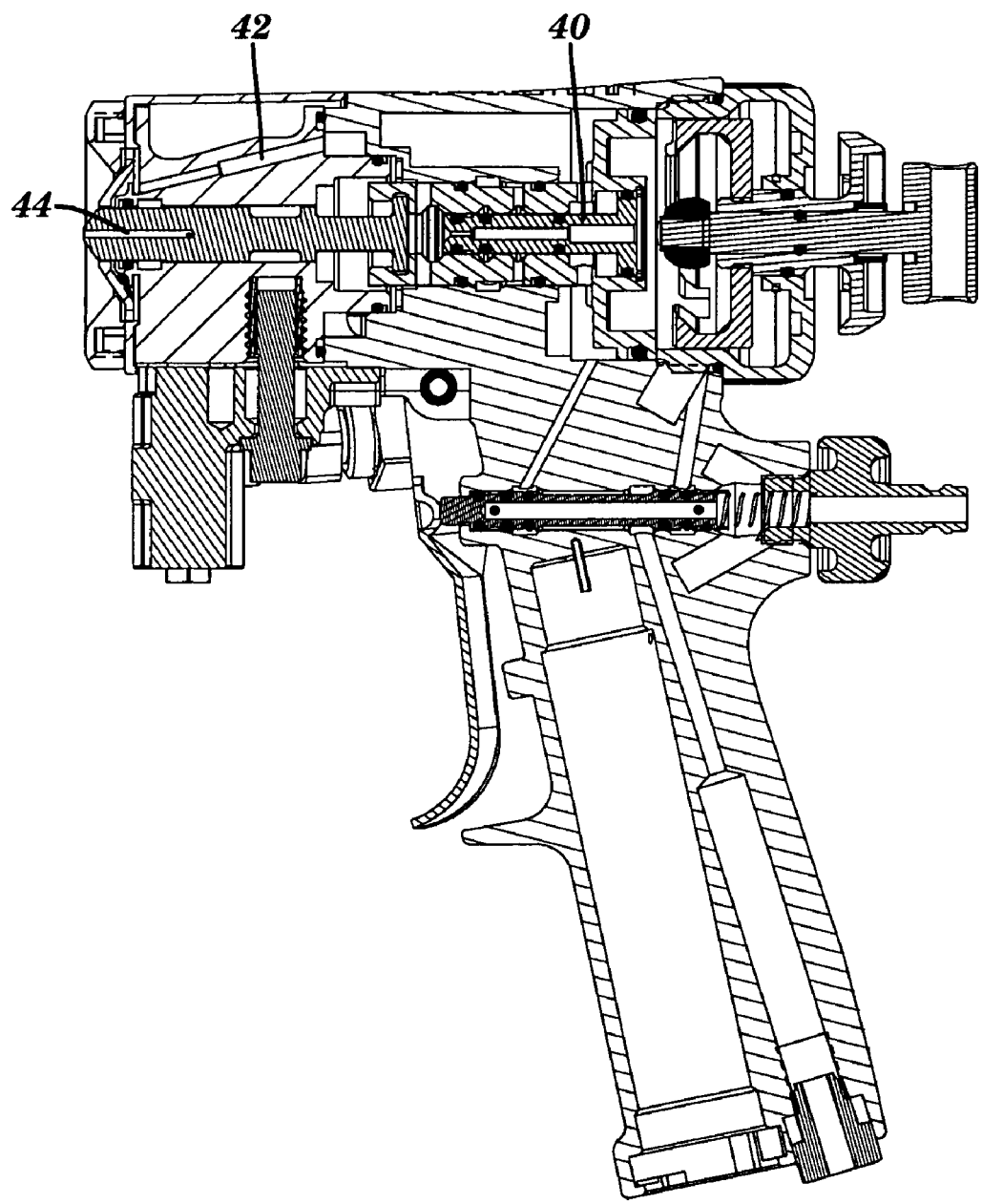
FIG. 4 shows an alternate embodiment of an air purge gun.

In an alternate embodiment of FIG. 4, the air purge gun automatically dispenses the solvent at de-trigger by means awl internal dosing pump 40. The dispensed solvent is mixed with the purge air 42 and expelled from the gun through the mixing chamber orifices 44.

Figure 5:
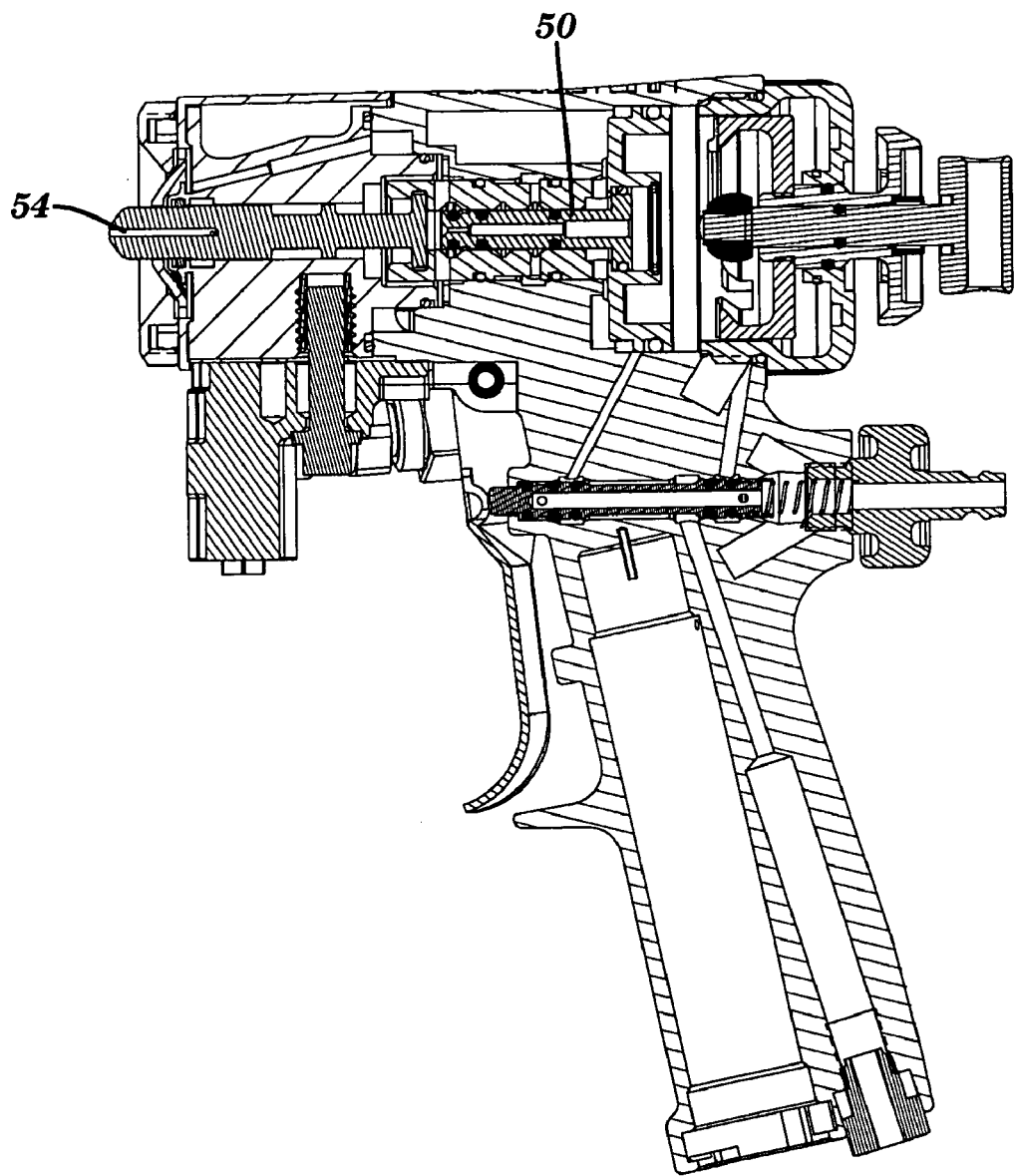
FIG. 5 shows another alternate embodiment of an air purge gun.

Alternatively in FIG. 5, the air purge gun automatically dispenses the solvent at de-trigger by means of an internal pumping mechanism 50. The dispensed solvent is mixed with the purge air 52 and expelled from the gun through the mixing chamber orifices 54.

Figure 6:
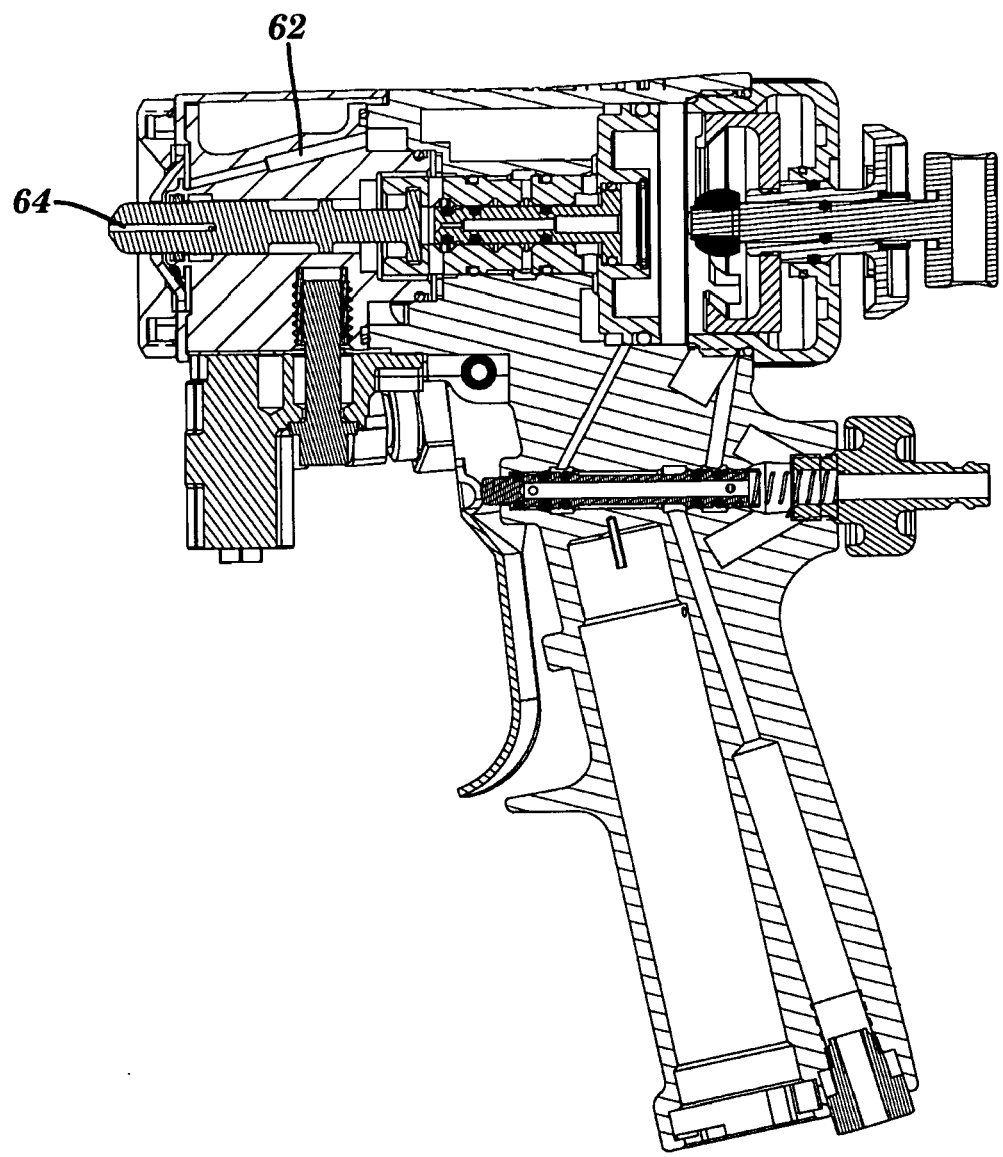
FIG. 6 shows yet another alternate embodiment of an air purge gun.

In another embodiment of FIG. 6, the an purge gun automatically dispenses the solvent at de-trigger by means of venturi effect 60. The solvent is injected into the air stream 62 and expelled from the applicator through the mixing chamber orifices 64. The solvent is either self contained in the applicator or plumbed eternally to the gun.

It is contemplated that various changes and modifications may be made to the solvent purge mechanism without departing from the spirit and scope of the invention as defined by the following claims.

The invention claimed is:

1. An air purge plural component spray gun having a mix chamber and a purge air passage selectively connecting pressurized air to said mix chamber, the improvement comprising:

a source of solvent; and a solvent piston having a front and a rear and movable between a first non-spraying position and a second spraying position such that in said first position, high pressure air is applied to said rear of said solvent piston to close a solvent bore connected to said solvent source to prevent passage of solvent into said mix chamber and in said second position, high pressure air is applied to said front of said solvent piston on detriggering said gun causing said solvent piston to retract uncovering said solvent bore, closing off a solvent inlet and allowing a slug of solvent to mix with purge air in said purge air passage and pass from a solvent outlet through said purge air passage and into said mix chamber.

* * * * *